(12) United States Patent
Sugiyama et al.

(10) Patent No.: US 9,010,137 B2
(45) Date of Patent: Apr. 21, 2015

(54) AIR CONDITIONER

(75) Inventors: Akiyoshi Sugiyama, Shizuoka-ken (JP); Yoshiro Nakamura, Shizuoka-ken (JP)

(73) Assignee: Toshiba Carrier Corporation, Minato-ku, Tokyo (JP)

( * ) Notice: Subject to any disclaimer, the term of this patent is extended or adjusted under 35 U.S.C. 154(b) by 652 days.

(21) Appl. No.: 13/120,841

(22) PCT Filed: Sep. 15, 2009

(86) PCT No.: PCT/JP2009/004598
§ 371 (c)(1),
(2), (4) Date: Jul. 7, 2011

(87) PCT Pub. No.: WO2010/035424
PCT Pub. Date: Apr. 1, 2010

(65) Prior Publication Data
US 2011/0257793 A1   Oct. 20, 2011

(30) Foreign Application Priority Data

Sep. 24, 2008  (JP) .................................. 2008-244865

(51) Int. Cl.
| | |
|---|---|
| *F25B 49/02* | (2006.01) |
| *F25B 49/00* | (2006.01) |
| *F24F 3/06* | (2006.01) |
| *F24F 11/00* | (2006.01) |
| *F25B 13/00* | (2006.01) |

(52) U.S. Cl.
CPC .............. *F24F 3/065* (2013.01); *F24F 11/008* (2013.01); *F25B 13/00* (2013.01); *F25B 49/025* (2013.01); *F25B 2313/0233* (2013.01); *F25B 2313/02741* (2013.01); *F25B 2600/021* (2013.01); *F25B 2600/2521* (2013.01); *Y02B 30/741* (2013.01)

(58) Field of Classification Search
USPC .............................. 62/226, 228.1, 228.4, 200
See application file for complete search history.

(56) References Cited

U.S. PATENT DOCUMENTS

| | | | | |
|---|---|---|---|---|
| 4,480,442 | A | * | 11/1984 | Ide et al. .......................... 62/175 |
| 4,720,982 | A | * | 1/1988 | Shimizu et al. ................. 62/204 |
| 4,926,653 | A | * | 5/1990 | Masuda et al. .................. 62/204 |
| 5,245,837 | A |   | 9/1993 | Kitamoto |
| 6,044,652 | A | * | 4/2000 | Nishihara et al. ............... 62/175 |
| 6,109,533 | A | * | 8/2000 | Ao et al. ........................ 237/2 B |

(Continued)

FOREIGN PATENT DOCUMENTS

| | | |
|---|---|---|
| GB | 2257243 | 1/1993 |
| JP | 8-033224 | 3/1996 |

(Continued)

OTHER PUBLICATIONS

Korean Office Action issued in KR2011-7009247 on Dec. 12, 2012.

(Continued)

*Primary Examiner* — Marc Norman
*Assistant Examiner* — Max Snow
(74) *Attorney, Agent, or Firm* — DLA Piper LLP (US)

(57) ABSTRACT

Disclosed is an air conditioner which can obtain an energy-saving effect without any change to the setting temperature set by a user and, accordingly, without causing discomfort to the user. If a capacity restriction mode is set to at least one of indoor units Y1 and Y2, the setting temperature Ts in the indoor units Y1 and Y2 is not changed and is maintained at a value set by the user and a compressor 1 is operated with the capacity less than the normal capacity.

7 Claims, 4 Drawing Sheets

(56) References Cited

U.S. PATENT DOCUMENTS

| | | | |
|---|---|---|---|
| 6,213,404 B1* | 4/2001 | Dushane et al. | 236/51 |
| 6,829,903 B2* | 12/2004 | Lee et al. | 62/229 |
| 7,937,961 B2* | 5/2011 | Yoon et al. | 62/175 |
| 2002/0157409 A1* | 10/2002 | Pham et al. | 62/228.3 |
| 2010/0281898 A1* | 11/2010 | Han et al. | 62/228.4 |

FOREIGN PATENT DOCUMENTS

| | | |
|---|---|---|
| JP | 10-47734 | 2/1998 |
| JP | 10-148377 | 6/1998 |
| JP | 2000-97473 | 4/2000 |
| JP | 2003-254590 | 9/2003 |
| JP | 2004-294029 | 10/2004 |
| JP | 2005-156017 | 6/2005 |
| JP | 2006-162197 | 6/2006 |
| JP | 2008-75979 | 4/2008 |

OTHER PUBLICATIONS

English Language Translation of Korean Office Action issued in KR2011-7009247 on Dec. 12, 2012.
English Language Abstract of JP 8-033224 published Mar. 29, 1996.
English Language Translation of JP 8-033224 published Mar. 29, 1996.
English Language Abstract of JP 2006-162197 published Jun. 22, 2006.
English Language Translation of JP 2006-162197 published Jun. 22, 2006.
English Language Abstract of JP 2003-254590 published Sep. 9, 2003.
English Language Translation of JP 2003-254590 published Sep. 9, 2003.
English Language Abstract of JP 10-148377 published Jun. 2, 1998.
English Language Translation of JP 10-148377 published Jun. 2, 1998.
English Language Abstract of JP 2008-75979 published Apr. 3, 2008.
English Language Translation of JP 2008-75979 published Apr. 3, 2008.
English Language Abstract of JP 2005-156017 published Jun. 15, 2005.
English Language Translation of JP 2005-156017 published Jun. 15, 2005.
English Language Translation of JP 10-47734 published Feb. 20, 1998.
English Language Abstract of JP 2004-294029 publishedOct. 21, 2004.
English Language Translation of JP 2004-294029 published Oct. 21, 2004.
International Search Report issued in PCT/JP2009/004598 on Mar. 2, 2010.
Korean Office Action issued in 2011-7009247 on Jun. 1, 2013.
English Language Translation of Korean Office Action issued in 2011-7009247 on Jun. 1, 2013.
Extended European Search Report issued in EP 09815846.2 on Jun. 23, 2014.
English Language Abstract of JP 2000-97473 published on Apr. 4, 2000.

* cited by examiner

| ZONE | COMPARISON VALUE |
|---|---|
| A | 100 |
| B | 95~99 |
| C | 85~94 |
| D | 75~84 |
| E | 65~74 |
| F | 50~64 |
| G | 25~49 |
| H | 0~24 | he present invention relates to an air conditioner of a multi-type that includes an outdoor unit and plural indoor units.

BACKGROUND ART

As an air conditioner of an energy-saving type, an air conditioner including a save operation switch where the indoor setting temperature set by a user is controlled to be decreased by the predetermined temperature during a cooling operation and a drying operation and is controlled to be increased by the predetermined temperature during a heating operation, when the save operation switch is turned on, is known (for example, refer to Patent Document 1). Further, an air conditioner that determines a maximum value and a minimum value of the setting temperature in advance, prohibits the setting temperature from becoming higher at the time of the heating operation and the setting temperature from becoming lower at the time of the cooling operation, and enables an energy-saving operation is known (for example, Patent Document 2).

PRIOR ART DOCUMENTS

Patent Documents

Patent Document 1: Japanese Patent ApplicationLaid-Open No. 6-294535
Patent Document 2: Japanese Patent ApplicationLaid-Open No. 2008-75980

DISCLOSURE OF INVENTION

Problems to be Solved by the Invention

However, in both the air conditioner that includes the save operation switch and the air conditioner that variously sets the maximum value and the minimum value of the setting temperature range, the setting temperature that is different from the setting temperature (displayed setting temperature) desired by the user is selected.

Therefore, during the cooling operation or the drying operation, the operation may be stopped before the indoor temperature is decreased to the temperature desired by the user. During the heating operation, the operation may be stopped before the indoor temperature is increased to the temperature desired by the user. That is, so-called early thermo-off is generated. For this reason, the user may feel discomfort.

The present invention has been made in view of the above circumferences and it is an object of the present invention to provide an air conditioner that can obtain an energy-saving effect without any change to the setting temperature set by a user and, accordingly, without causing discomfort to the user.
Means for Solving the Problems In order to achieve the above object, an air conditioner according to the present invention includes an outdoor unit which has a compressor of a capacity variable type and an outdoor heat exchanger, a plurality of indoor units, each having an indoor heat exchanger and a flow regulator valve, a first controller which is provided in each indoor unit and detects a difference between a room temperature and a set temperature as an air conditioning load for each indoor unit, the first controller informing the outdoor unit of a request capacity according to an air conditioning load for each indoor unit, a second controller which is provided in the outdoor unit and controls the capacity of the compressor of the capacity variable type according to a sum of the request capacities of the indoor units, an operation circuit which is provided in remote control operators operatively coupled to each indoor unit and designates a capacity restriction mode, and a third controller which is provided in each indoor unit and sets a maximum value for the request capacity of the indoor unit where the capacity restriction mode is set without changing the set temperature and without stopping operation of each indoor unit before a sufficient increase or decrease of indoor temperature to the set temperature, when the capacity restriction mode is set by the operation circuit, a determining circuit which is provided in each indoor unit and determines whether the outdoor unit accepts the capacity restriction based on a signal from the outdoor unit, a fourth controller which is provided in each indoor unit, allows setting of the maximum value by the third controller, when a determination result of the determining circuit is YES, and prohibits settings of the maximum value by the third controller, when the determination result of the determining circuit is NO, and a value aperture controller which is provided in the outdoor unit and calculates an aperture of the flow regulating valve of each indoor unit according to the request capacity set by the third controller.
Effect of the Invention According to the present invention, an air conditioner that can obtain an energy-saving effect without any change to the setting temperature set by a user and, accordingly, without causing discomfort to the user, can be provided.

BEST MODE FOR CARRYING OUT THE INVENTION

Figure 1:
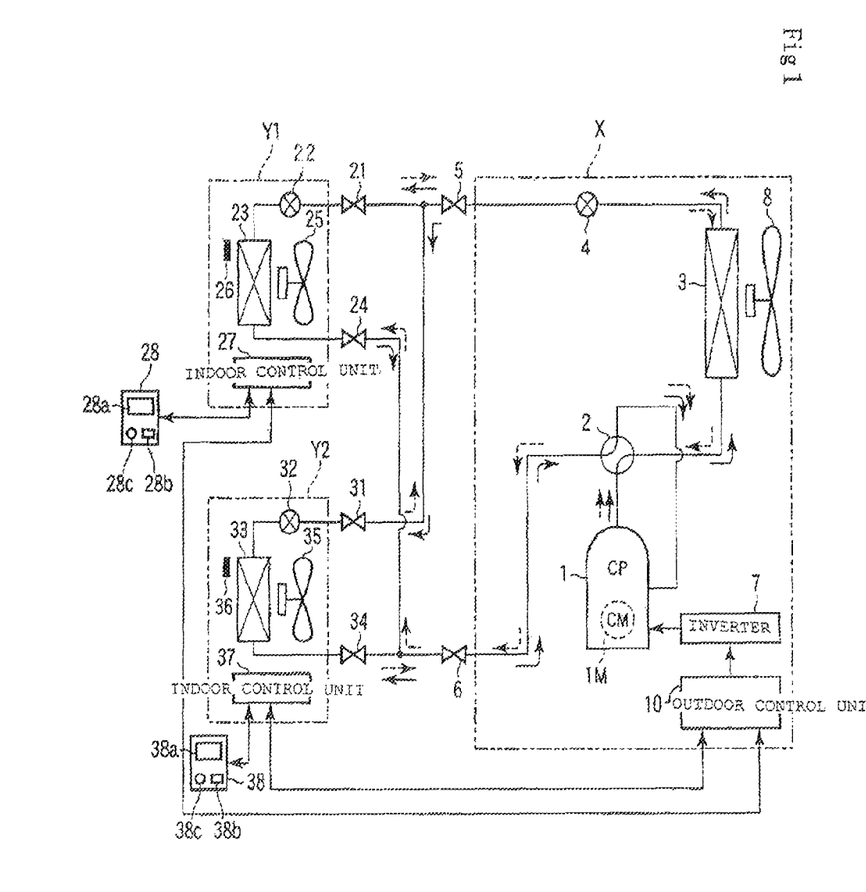
FIG. 1 a block diagram showing the configuration according to each embodiment of the present invention.

Hereinafter, embodiments of the present invention will be described with reference to the drawings.
First Embodiment
Hereinafter, the first embodiment of the present invention will be described with reference to the drawings.
As shown in FIG. 1, a cooling medium that is ejected from a compressor 1 is supplied to an outdoor heat exchanger 3 through a four-way valve 2 and the cooling medium that passes through the outdoor heat exchanger 3 flows to an indoor heat exchanger 23 through an expansion valve 4, packed valves 5 and 21, and a flow regulating valve (PMV: Pulse Motor Valve) 22.

The cooling medium that passes through the outdoor heat exchanger 3 flows to an indoor heat exchanger 33 through the expansion valve 4, the packed valves 5 and 31, and a flow regulating valve 32. The cooling medium that passes through the indoor heat exchanger 23 is sucked into the compressor 1 through packed valves 24 and 6 and the four-way valve 2. Meanwhile, the cooling medium that passes through the indoor heat exchanger 33 is sucked into the compressor 1 through packed valves 34 and 6 and the four-way valve 2.

Since a flow of the cooling medium shown by an arrow of a solid line is a flow of the cooling medium at the time of a cooling operation and a drying operation, the outdoor heat exchanger 3 functions as a condenser and the indoor heat exchangers 23 and 33 function as an evaporator. At the time of a heating operation, the four-way switch 2 is switched, the cooling medium flows in a direction shown by an arrow of a broken line, and the indoor heat exchangers 23 and 33 function as a condenser and the outdoor heat exchanger 3 functions as an evaporator.

The compressor 1 has a motor 1M. As the compressor 1, a compressor of a capacity variable type where the number of revolutions changes according to a frequency F of a driving voltage supplied from an inverter 7 is used. In the vicinity of the outdoor heat exchanger 3, an outdoor fan 8 is provided. Driving of the inverter 7 and the outdoor fan 8 is controlled by an outdoor control unit 10.

The compressor 1, the four-way valve 2, the outdoor heat exchanger 3, the expansion valve 4, the inverter 7, the outdoor fan 8, the outdoor control unit 10, and a cooling medium pipeline configure an outdoor unit X.

In the vicinity of the indoor heat exchanger 23, an indoor fan 25 and an indoor temperature sensor 26 are provided. Driving of the indoor fan 25 is controlled by an indoor control unit 27. The indoor temperature sensor 26 detects the indoor temperature Ta and the detection temperature Ta is monitored by the indoor control unit 27.

The flow regulating valve 22, the indoor heat exchanger 23, the indoor fan 25, the indoor temperature sensor 26, the indoor control unit 27, and the cooling medium pipeline configure an indoor unit Y1.

In the vicinity of the indoor heat exchanger 33, an indoor fan 35 and an indoor temperature sensor 36 are provided. Driving of the indoor fan 35 is controlled by an indoor control unit 37. The indoor temperature sensor 36 detects the indoor temperature Ta and the detection temperature Ta is monitored by the indoor control unit 37.

The flow regulating valve 32, the indoor heat exchanger 33, the indoor fan 35, the indoor temperature sensor 36, the indoor control unit 37, and the cooling medium pipeline configure an indoor unit Y2.

That is, an air conditioner of a multi-type is configured by the outdoor unit X and the plural indoor units Y1 and Y2 and a refrigeration cycle of a heat pump type is mounted in the outdoor unit X and the indoor units Y1 and Y2.

To the indoor control units 27 and 37, remote control units 28 and 38 that function as operators of a remote control type to set the setting temperature Ta or an operation mode are connected, respectively.

The remote control unit 28 of the indoor unit Y1 includes a liquid crystal display unit 28a and an operation unit that is provided with a save switch 28b corresponding to an operation means to designate a capacity restriction mode and a save lamp (light emitting diode) 28c to inform whether the capacity restriction mode is designated or not.

Likewise, the remote control unit 38 of the indoor unit Y2 includes a liquid crystal display unit 38a and an operation unit that is provided with a save switch 38b corresponding to an operation means to designate the capacity restriction mode and a save lamp (light emitting diode) 38c to inform whether the capacity restriction mode is designated or not.

The indoor control units 27 and 37 of the indoor units Y1 and Y2 are connected to the outdoor control unit 10 of the outdoor unit X.

In this case, the indoor control units 27 and 37 have the following means of (1) to (3) as main functions.

(1) A detecting means that detects the difference $\Delta T$ of the detection temperature Ta of the indoor temperature sensors 26 and 36 and the setting temperature Ts set by the user using the remote control units 28 and 38 as an air conditioning load.

(2) A control means (first control means) that informs the outdoor unit X of the request capacity according to the air conditioning load $\Delta T$ detected by the detecting means as an operation frequency instruction (any one of S0, S3, S5, . . . and SF).

(3) A control means (third control means) that sets a maximum value to the request capacity according to the air conditioning load $\Delta T$, when the save switches 28b and 38b of the remote control units 28 and 38 are turned on and the capacity restriction mode is set.

Further, the outdoor control unit 10 has the following means of (11) as a main function.

(11) A control means (second control means) that controls the capacity (output frequency F of the inverter 7) of the compressor 1 according to a sum of the request capabilities (operation frequency instructions) of the indoor units Y1 and Y2.

Figure 2:
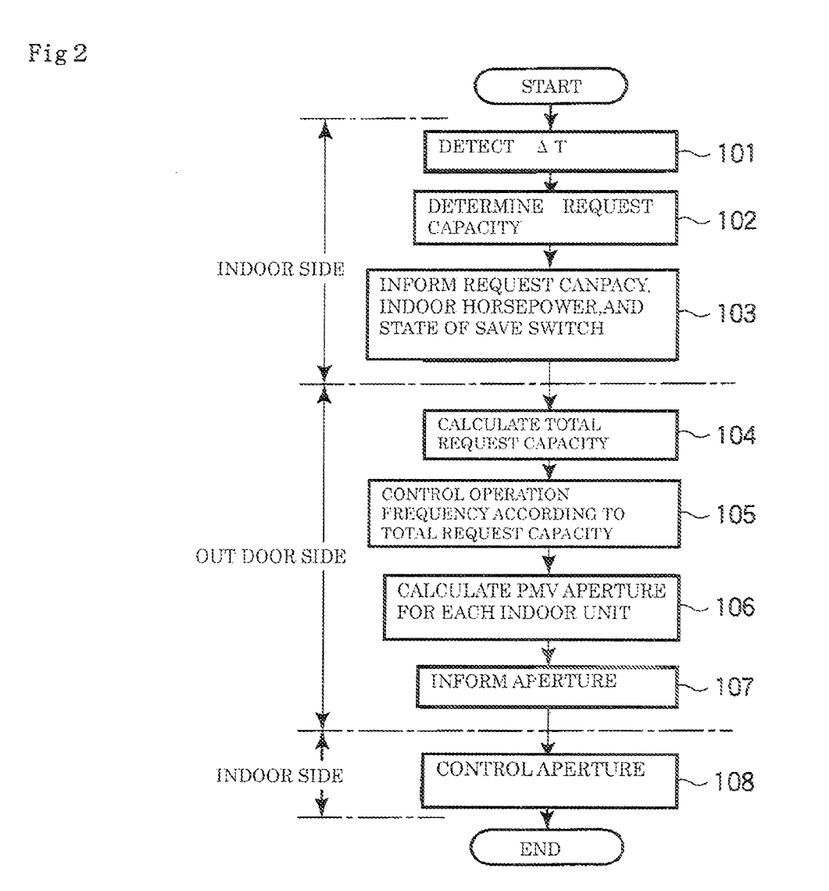
FIG. 2 is a flowchart illustrating a function according to a first embodiment.

Next, the functions will be described with reference to a flowchart of FIG. 2.

At the time of the cooling operation or the drying operation, in the indoor units Y1 and Y2, the difference $\Delta T$ (Ta−Ts) of the detection temperature Ta of the indoor temperature sensors 26 and 36 and the setting temperature Ts set by the remote control units 28 and 38 is detected as the air conditioning load in step 101.

At the time of the heating operation, the difference $\Delta T$ (Ts to Ta) of the setting temperature Ts set by the remote control units 28 and 38 and the detection temperature Ta of the indoor temperature sensors 26 and 36 is detected as the air conditioning load in step 101.

Figure 3:
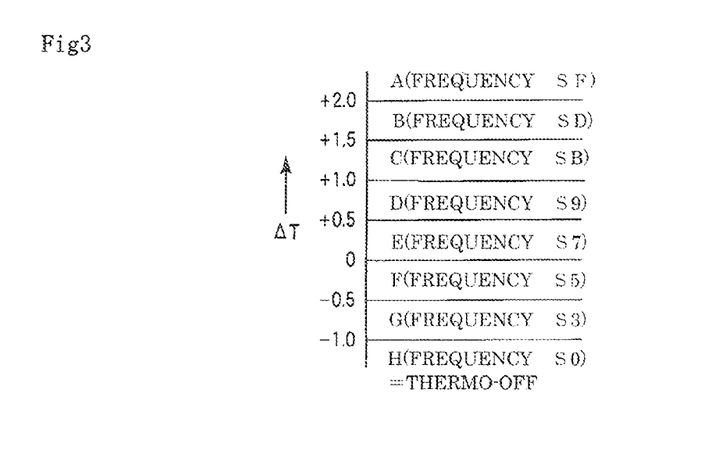
FIG. 3 is a diagram showing request capacity determining conditions in each embodiment.

The request capacity determining conditions of FIG. 3 that are stored in internal memories of the indoor control units 27 and 37 are referred to on the basis of the detected air conditioning load $\Delta T$, and the operation frequency instruction (any one of S0, S3, S5, . . . and SF) is determined as the request capacity according to the air conditioning load $\Delta T$ in step 102.

For example, as shown in FIG. 3, if the detection temperature Ta at the time of the cooling operation is 28.6° C. and the setting temperature Ts is 27° C., the air conditioning load $\Delta T$ becomes a B zone of "+1.6° C." and an operation frequency instruction SD is determined as the request capacity.

If the detection temperature Ta at the time of the cooling operation is 28.3° C. and the setting temperature Ts is 27° C., the air conditioning load $\Delta T$ becomes a C zone of "+1.3° C." and an operation frequency instruction SB is determined as the request capacity.

However, if the save switch 28b of the remote control unit 28 is turned on, the capacity restriction mode is set by the indoor unit Y1 and the maximum value is set to the request capacity according to the air conditioning load $\Delta T$.

Figure 4:
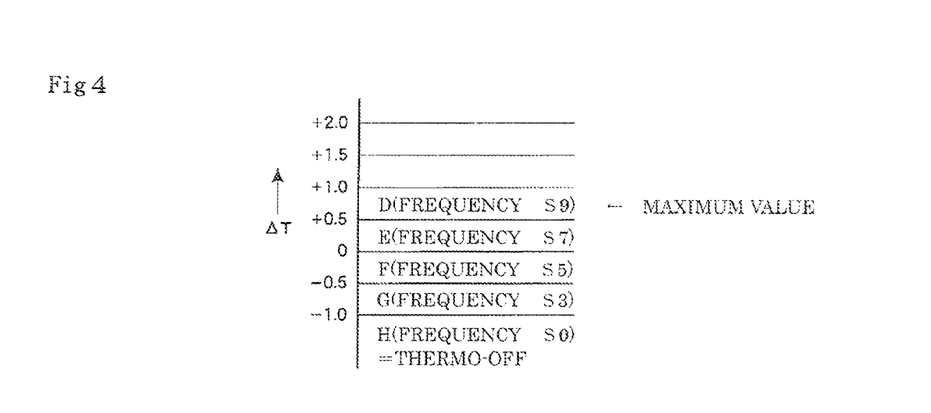
FIG. 4 is a diagram showing a maximum value that is set with respect to the request capacity determining conditions of FIG. 3.

For example, as shown in FIG. 4, if the D zone of the operation frequency instructions of the request capacity determining conditions is set as the maximum value, an operation frequency instruction S9 of the D zone is determined with respect to the air conditioning load $\Delta T$ of "+0.5° C. or more." At this time, the save lamp 28c of the remote control unit 28 is turned on and information indicating that the indoor unit Y1 is in the capacity restriction mode is informed to the user.

As such, the operation frequency instructions that are determined by the indoor units Y1 and Y2, indoor horsepower information (called capacity ranks) of the indoor units Y1 and Y2, and information indicating states of the save switches 28b and 38b are transmitted to the outdoor unit X in step 103.

In the outdoor unit X, the total request capacity of the indoor units Y1 and Y2 is calculated on the basis of the operation frequency instructions and the indoor horsepower information from the indoor units Y1 and Y2 in step 104. When the total request capacity is calculated, a correction operation according to the inflow cooling medium temperature/outflow cooling medium temperature of the indoor heat exchangers 23 and 33 is added.

The operation frequency (output frequency of the inverter 7) F of the compressor 1 is determined according to the calculated total request capacity and the compressor 1 is actually driven with the operation frequency F in step 105.

A cooling medium distribution ratio with respect to the indoor units Y1 and Y2 is calculated on the basis of the operation frequency instructions and the indoor horsepower information from the indoor units Y1 and Y2, and the apertures of the flow regulating valves (PWM) 22 and 32 that correspond to the cooling medium distribution ratio are calculated in step 106.

Aperture information is transmitted to the indoor units Y1 and Y2 in step 107. In the indoor units Y1 and Y2, the apertures of the flow regulating valves 22 and 32 are controlled according to the aperture information from the outdoor unit X in step 108.

As such, if the capacity restriction mode is set to at least one of the indoor units Y1 and Y2, the compressor 1 is operated with the capacity less than the normal capacity. Therefore, an energy-saving effect is obtained.

In particular, since the setting temperature Ts in the indoor units Y1 and Y2 is not changed and is maintained at the value set by the user using the remote control units 28 and 38, the early thermo-off where the operation is stopped before the indoor temperature is sufficiently decreased at the time of the cooling operation or the drying operation is not generated, and the user does not feel discomfort such as heat and humidity.

The early thermo-off where the operation is stopped before the indoor temperature is sufficiently increased at the time of the heating operation is not generated, and the user does not feel discomfort such as chill in the air.

If the save switches 28b and 38b of the remote control units 28 and 38 are turned off, the capacity restriction mode of the indoor units Y1 and Y2 is released. As a result, setting of the maximum value in the request capacity determining conditions is released, the compressor 1 is operated with the normal capacity, and the save lamps 28c and 38c are turned off.

In the first embodiment, the D zone of the request capacity determining conditions is set as the maximum value. The setting zone is not limited and may be appropriately set according to the indoor horsepower. The case where the remote control units 28 and 38 are of the wired type is described. However, the remote control units 28 and 38 may be of a wireless type.

Second Embodiment

In the second embodiment, plural, for example, four capacity restriction modes can be selectively designated by the save switches 28b and 38b of the remote control units 28 and 38.

The indoor control units 27 and 37 of the indoor units Y1 and Y2 have the following means of (3a), instead of the means of (3) in the first embodiment.

(3a) A control means (third control means) that sets the maximum value to the request capacity according to the air conditioning load $\Delta T$, according to the capacity restriction mode designated by the save switches 28b and 38b of the remote control units 28 and 38.

Next, the functions of the second embodiment will be described.

If a first capacity restriction mode is set by the save switch 28b or the save switch 38b, a maximum value max1 is set to the request capacity according to the air conditioning load $\Delta T$.

Figure 5:
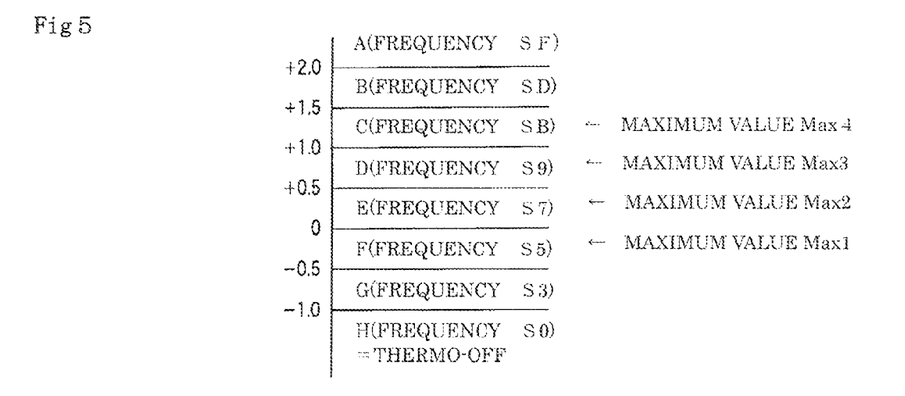
FIG. 5 is a diagram showing plural maximum values that are set with respect to the request capacity determining conditions of FIG. 3.

That is, as shown in FIG. 5, the F zone of the operation frequency instructions of the request capacity determining conditions is set as the maximum value, and an operation frequency instruction S5 of the F zone is determined with respect to the air conditioning load $\Delta T$ of "−0.5° C. or more."

If a second capacity restriction mode is set, a maximum value max2 is set to the request capacity according to the air conditioning load $\Delta T$. That is, as shown in FIG. 5, the E zone of the operation frequency instructions of the request capacity determining conditions is set as the maximum value, and an operation frequency instruction S7 of the E zone is determined with respect to the air conditioning load $\Delta T$ of "+0° C. or more."

If a third capacity restriction mode is set, a maximum value max3 is set to the request capacity according to the air conditioning load $\Delta T$. That is, as shown in FIG. 5, the D zone of the operation frequency instructions of the request capacity determining conditions is set as the maximum value, and an operation frequency instruction S9 of the D zone is determined with respect to the air conditioning load $\Delta T$ of "+0.5° C. or more."

Likewise, if a fourth capacity restriction mode is set, a maximum value max4 is set to the request capacity according to the air conditioning load $\Delta T$. That is, as shown in FIG. 5, the C zone of the operation frequency instructions of the request capacity determining conditions is set as the maximum value, and an operation frequency instruction SB of the C zone is determined with respect to the air conditioning load $\Delta T$ of "+1.0° C. or more."

In the outdoor unit X, the total request capacity of the indoor units Y1 and Y2 is calculated on the basis of the operation frequency instructions and the indoor horsepower information from the indoor units Y1 and Y2, and the operation frequency F of the compressor 1 is determined according to the calculated total request capacity.

As such, in the indoor units Y1 and Y2, the plural capacity restriction modes can be selectively set, and the capacity reduction width of the compressor 1 is varied according to each capacity restriction mode. The user can freely select the capacity restriction width.

Since the other configuration, function, and effect are the same as those of the first embodiment, the description thereof will not be repeated.

Third Embodiment

In the third embodiment, the maximum value can be designated by numerical values of "0%" to "100%," by the save switches 28a and 38a of the remote control units 28 and 38.

The indoor control units 27 and 37 of the indoor units Y1 and Y2 have the following means of (3b), instead of the means of (3) in the first embodiment.

(3b) A control means (third control means) that variably sets the maximum value according to the numerical values of "0%" to "100%" designated by the save switches 28a and 38a.

Next, the functions of the third embodiment will be described.

Figure 6:
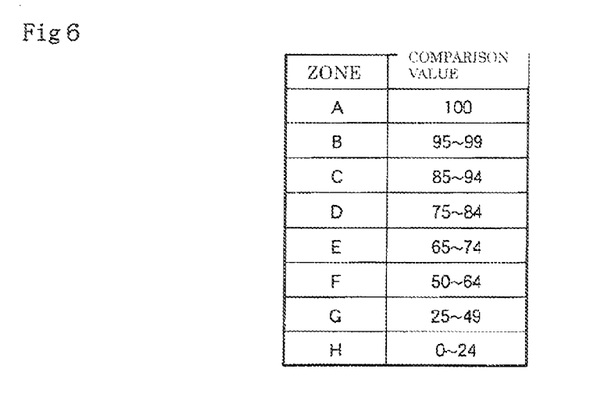
FIG. 6 is a diagram showing a relationship of designation of a numerical value and a maximum value in a third embodiment.

As shown in FIG. 6, the numerical values "0%" to "100%" are allocated to the zones H to A in the request capacity determining conditions of FIG. 3.

For example, if the numerical value "100%" is set by the save switch 28b or the save switch 38b, the A zone of the operation frequency instructions of the request capacity determining conditions is set as the maximum value, and the operation frequency instruction SF of the A zone is determined with respect to the air conditioning load ΔT of "+2.0° C. or more."

In this case, if the numerical value "90%" is set by the save switch 28b or the save switch 38b, the C zone of the operation frequency instructions of the request capacity determining conditions is set as the maximum value, and the operation frequency instruction SF of the C zone is determined with respect to the air conditioning load ΔT of "+1.0° C. or more."

If the numerical value "50%" is set by the save switch 28b or the save switch 38b, the F zone of the operation frequency instructions of the request capacity determining conditions is set as the maximum value, and an operation frequency instruction S5 of the F zone is determined with respect to the air conditioning load ΔT of "−0.5° C. or more."

In the outdoor unit X, the total request capacity of the indoor units Y1 and Y2 is calculated on the basis of the operation frequency instructions and the indoor horsepower information from the indoor units Y1 and Y2, and the operation frequency F of the compressor 1 is determined according to the calculated total request capacity.

As such, in the indoor units Y1 and Y2, the capacity restriction ratio can be freely set as the continuous numerical value.

Since the other configuration, function, and effect are the same as those of the first embodiment, the description thereof will not be repeated.

Fourth Embodiment

In the fourth embodiment, the indoor control units 27 and 37 have the following means of (4) and (5), in addition to the means of (1) to (3) in the first embodiment.

(4) A determining means that determines whether the outdoor unit X can accept the capacity restriction.

(5) A control means (fourth control means) that allows setting of the maximum value by the control means of (3), when a determination result of the determining means is YES, and prohibits setting of the maximum value by the control means of (3), when the determination result of the determining means is NO.

When power is supplied, an inquiry signal that inquires whether the capacity restriction can be accepted is transmitted from the indoor control units 27 and 37 to the outdoor control unit 10. A response signal of the outdoor control unit 10 with respect to the inquiry signal is transmitted to the indoor control units 27 and 37, and the indoor control units 27 and 37 determine whether the outdoor unit X can accept the capacity restriction.

When a determination result is YES, with the determination that the outdoor unit X can accept the capacity restriction or the determination that an acceptance system of the capacity restriction is set in the outdoor unit X, setting of the capacity restriction mode by the operations of the save switches 28b and 38b (that is, setting of the maximum value with respect to the air conditioning load ΔT) is allowed.

When the determination result is NO, with the determination that the outdoor unit X cannot accept the capacity restriction or the determination that an acceptance system of the capacity restriction is not set in the outdoor unit X, setting of the capacity restriction mode by the operations of the save switches 28b and 38b is prohibited.

When setting of the capacity restriction mode is prohibited, if the sage switches 28b and 38b are operated, characters indicating that there is no "capacity restriction function" is displayed on liquid crystal display units 28a and 38a of the remote control units 28 and 38. The user views the display and can be informed that the capacity restriction is not possible.

As such, since the setting of the capacity restriction mode is automatically allowed or prohibited in the sides of the indoor units Y1 and Y2 according to the kind or setting of the outdoor unit X, the conditions do not need to be set to each of the indoor units Y1 and Y2. Even though the current outdoor unit X cannot accept the capacity restriction, an outdoor unit X of an energy-saving type that is scheduled to be added to the lineup in the future and enables the capacity restriction can be purchased and used.

Since the other configuration, function, and effect are the same as those of the first embodiment, the description thereof will not be repeated.

Fifth Embodiment

In the fifth embodiment, the indoor control units 27 and 37 have the following means of (6) and (7), in addition to the means of (1) to (3) in the first embodiment.

(6) A storage means that downloads validation/invalidation information indicating whether designation by the save switches 28b and 38b is validated or invalidated from a personal computer and stores the validation/invalidation information in an internal memory.

(7) A control means (fifth control means) that prohibits setting of the maximum value by the third control means, regardless of the designation by the save switches 28b and 38b, when the validation/invalidation information stored in the storage means indicates invalidation.

That is, if the validation/invalidation information indicating that the designation by the save switches 28b and 38b is validated is stored in the internal memories of the indoor control units 27 and 37, the capacity restriction mode can be set by the save switches 28b and 38b.

Meanwhile, if the validation/invalidation information indicating that the designation by the save switches 28b and 38b is invalidated is stored in the internal memories of the indoor control units 27 and 37, the capacity restriction mode is not set, even though the save switches 28b and 38b are operated.

As such, the user can freely select whether the capacity restriction is validated or invalidated, according to an indoor environment or an arrangement place.

Since the other configuration, function, and effect are the same as those of the first embodiment, the description thereof will not be repeated.

In the embodiments described above, the case where the number of indoor units is two is described. However, the number of indoor units is not limited to two and may be three or more.

The present invention is not limited to the embodiments and may adopt the configuration where the embodiments are appropriately combined, and various modifications can be made without departing from the scope of the present invention.

INDUSTRIAL APPLICABILITY

According to the present invention, since the setting temperature set by the user is not changed, the operation is not stopped before the indoor temperature is sufficiently decreased at the time of the cooling operation or the drying operation. Further, the operation is not stopped before the indoor temperature is sufficiently increased at the time of the heating operation. Therefore, an air conditioner that does not cause discomfort to the user in all cases can be provided.

DESCRIPTION OF LETTERS OR NUMERALS

1: compressor
2: four-way valve
3: indoor heat exchanger
4: expansion valve
7: inverter
10: outdoor control unit
22, 32: flow regulating valve
23, 33: indoor heat exchanger
27, 37: indoor control unit
28, 38: remote control unit
28a, 38a: liquid crystal display unit
28b, 38b: save switch
28c, 38c: save lamp
[FIG. 1]
27, 37: INDOOR CONTROL UNIT
7: INVERTER
10: OUTDOOR CONTROL UNIT
[FIG. 2]
START
101: DETECT AT
102: DETERMINE REQUEST CAPACITY
103: INFORM REQUEST CAPACITY, INDOOR HORSEPOWER, AND STATE OF SAVE SWITCH
INDOOR SIDE
104: CALCULATE TOTAL REQUEST CAPACITY
105: CONTROL OPERATION FREQUENCY ACCORDING TO TOTAL REQUEST CAPACITY
106: CALCULATE PMV APERTURE FOR EACH INDOOR UNIT
107: INFORM APERTURE
OUTDOOR SIDE
108: CONTROL APERTURE
INDOOR SIDE
END
[FIG. 3]
FREQUENCY
THERMO-OFF
[FIG. 4]
FREQUENCY
THERMO -OFF
MAXIMUM VALUE
[FIG. 5]
FREQUENCY
THERMO-OFF
MAXIMUM VALUE
[FIG. 6]
ZONE
COMPARISON VALUE

The invention claimed is:

1. An air conditioner, comprising:
an outdoor unit which has a compressor of a capacity variable type and an outdoor heat exchanger;
a plurality of indoor units, each having an indoor heat exchanger and a flow regulating valve;
a first controller which is provided in each indoor unit and detects a difference between a room temperature and a set temperature as an air conditioning load for each indoor unit, the first controller informing the outdoor unit of a request capacity according to an air conditioning load for each indoor unit;
a second controller which is provided in the outdoor unit and controls the capacity of the compressor of the capacity variable type according to a sum of the request capacities of the indoor units;
an operation circuit which is provided in remote control operators operatively coupled to each indoor unit and designates a capacity restriction mode;
a third controller which is provided in each indoor unit and sets a maximum value for the request capacity of the indoor unit where the capacity restriction mode is set without changing the set temperature and without stopping operation of each indoor unit before a sufficient increase or decrease of indoor temperature to the set temperature, when the capacity restriction mode is set by the operation circuit;
a determining circuit which is provided in each indoor unit and determines whether the outdoor unit accepts the capacity restriction based on a signal from the outdoor unit; and
a fourth controller which is provided in each indoor unit, allows setting of the maximum value by the third controller, when a determination result of the determining circuit is YES, and prohibits setting of the maximum value by the third controller, when the determination result of the determining circuit is NO; and
a valve aperture controller which is provided in the outdoor unit and calculates an aperture of the flow regulating valve of each indoor unit according to the request capacity set by the third controller.

2. The air conditioner of claim 1,
wherein the operation circuit selectively designates a plurality of capacity restriction modes, and
the third controller has a range of maximum values that can be set as the maximum value and selectively sets any one of the maximum values according to the capacity restriction mode designated by the operation circuit.

3. The air conditioner of claim 1,
wherein the operation circuit designates a numerical value, and
the third controller variably sets the maximum value according to the numerical value designated by the operation circuit.

4. The air conditioner of claim 1, further comprising:
a storage device which is provided in each indoor unit and stores validation/invalidation information indicating whether the designation by the operation circuit is validated/invalidated; and
a fifth controller which is provided in each indoor unit and prohibits setting of the maximum value by the third controller, regardless of the designation by the operation circuit, when the validation/invalidation information stored in the storage device indicates invalidation.

5. The air conditioner of claim 2, further comprising:
a storage device which is provided in each indoor unit and stores validation/invalidation information indicating whether the designation by the operation circuit is validated/invalidated; and
a fifth controller which is provided in each indoor unit and prohibits setting of the maximum value by the third controller, regardless of the designation by the operation circuit, when the validation/invalidation information stored in the storage device indicates invalidation.

6. The air conditioner of claim 3, further comprising:
a storage device which is provided in each indoor unit and stores validation/invalidation information indicating whether the designation by the operation circuit is validated/invalidated; and a fifth controller which is provided in each indoor unit and prohibits setting of the maximum value by the third controller, regardless of the designation by the operation circuit, when the validation/invalidation information stored in the storage device indicates invalidation.

7. The air conditioner of claim 1, wherein the maximum value to the request capacity corresponds to an operation frequency instruction of each of the outdoor units.

\* \* \* \* \*